United States Patent Office 3,013,261
Patented Dec. 12, 1961

3,013,261
DOPPLER RADAR RECEIVER
Robert E. Leahy, Plainview, N.Y., assignor to Sperry Rand Corporation, a corporation of Delaware
Filed Feb. 26, 1959, Ser. No. 795,691
10 Claims. (Cl. 343—8)

The present invention relates to radar receivers for detecting the Doppler frequency component of a received signal.

If continuous wave energy is transmitted to a relatively moving target the frequency of energy reflected by the target differs from that of the transmitted energy by a Doppler frequency. In one type of Doppler radar system that is known in the art, the radar receiver includes a heterodyning system that has a plurality of stages for converting the frequency of the received energy to a much lower frequency that is determined by the frequency of a final local oscillator and the Doppler frequency. A discriminator responds to the output of the heterodyning system for producing a D.-C. output whose magnitude and polarity are functions of the Doppler frequency. Such a system is shown and described in U.S. Patent No. 2,695,-404, issued on November 23, 1954 to John L. Barker, for example.

In the arrangement described above, the frequency of the local oscillator in the last stage of the heterodyning system must equal the center frequency of the discriminator to produce an output that is related directly to the Doppler frequency. If the frequency of the oscillator differs from the center frequency, the D.-C. output produced by the discriminator is a function of both this frequency difference and the Doppler frequency. Thus, it has been required heretofore that the frequency of this local oscillator remain at the center frequency of the discriminator to produce an output that is related unambiguously to the Doppler frequency only.

It is an object of the present invention to provide a system that includes a frequency discriminator for determining from a beat frequency signal the frequency of one of two signals producing said beat signal despite variations in the frequency of the other of said two signals.

It is another object to provide a Doppler radar receiver that includes a heterodyning system for supplying a frequency discriminator with a beat frequency input that can be detected by the discriminator for producing an output that is a direct function of a Doppler frequency component despite variations in the frequency of a local oscillator signal that heterodynes with said Doppler frequency component to produce said beat frequency input.

It is a further object to provide a Doppler radar receiver for producing a D.-C. output that is related directly to the relative speed of a target despite variations in the frequencies of any of the local oscillators in the heterodyning system of the radar receiver.

The foregoing and other objects are attained by providing a radar receiver that has a heterodyning system for producing an output whose frequency is changed alternately from one that is equal to the algebraic sum of a local oscillator frequency and a Doppler frequency to another that is at said local oscillator frequency only. A frequency discriminator is provided for responding to the output of the heterodyning system for producing an output that has an alternating component whose amplitude is related directly to the Doppler frequency. A switch demodulator responds to the alternating component for producing a D.-C. voltage that is related directly to the Doppler frequency.

The details of the present invention together with other objects and advantages thereof will become more apparent from the following description and the drawings wherein.

Figure 1:
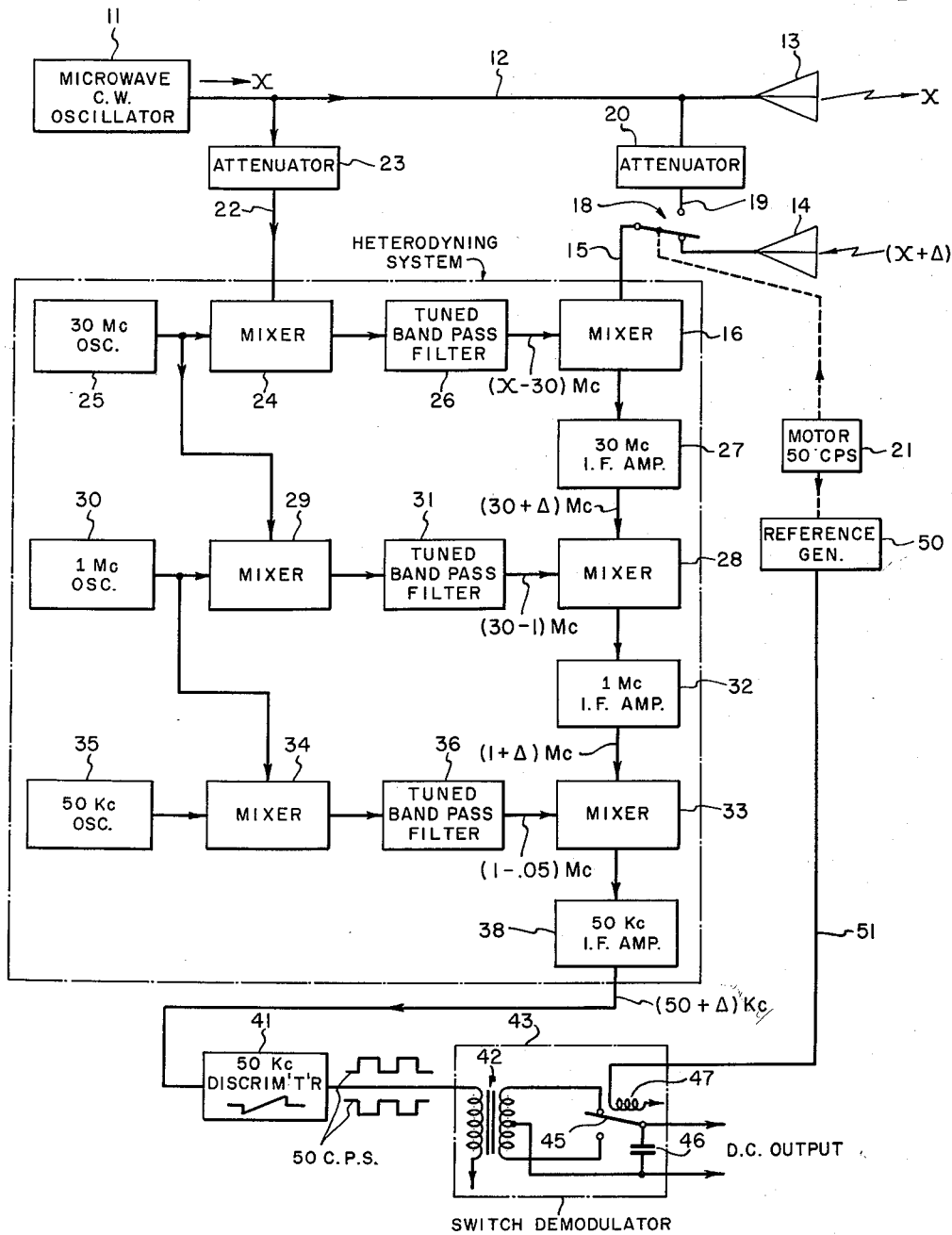
FIG. 1 is a block diagram of a first embodiment of the invention.

Referring now to FIG. 1, a transmitting means that includes an oscillator 11, a transmission line 12 and an antenna 13 is provided for directing energy at a target. The oscillator 11 produces continuous wave energy at a microwave frequency of X megacycles per second that is substantially constant.

A receiving antenna 14 is connected to the input 15 of a microwave mixer 16 that is part of an input stage of a heterodyning system for the radar receiver. This connection is made by a microwave switch 18 that connects the mixer 16 alternately to the receiving antenna 14 and to the transmitting means of the radar system. The connection to the transmitting means is made by a section of transmission line 19 that includes a microwave attenuator 20 for sampling a small portion of the transmitted energy.

A motor 21 is provided for actuating the switch 18 at a frequency of 50 cycles per second, for example. For the moment, it will be assumed that the switch 18 is in the position indicated in FIG. 1. Thus, the energy that is supplied to the input 15 of mixer 16 has a frequency of $(X+\Delta)$ megacycles, where $\Delta$ is an unknown Doppler frequency that is a function of the relative speed of the target.

A transmission line 22 that includes a microwave attenuator 23 is provided for supplying a small portion of the transmitted energy to one of the inputs of a further microwave mixer 24. This energy is heterodyned with energy from a local oscillator 25 whose frequency is at 30 megacycles per second, for example. The output of mixer 24 is supplied to a tuned band pass filter 26 such as a cavity resonator that passes the lower side band component only at a frequency of $(X-30)$ megacycles, while blocking the other components of the output from mixer 24.

The mixer 16 heterodynes the output of filter 26 with the signal supplied to the mixer input 15. The output of mixer 16 includes a difference frequency component of $(30+\Delta)$ megacycles at the moment the mixer 16 is connected to the antenna 14 by switch 18. The Doppler frequency $\Delta$ has a minus sign if the target is departing from the system and a plus sign if the target is approaching the system.

A tuned intermediate frequency amplifier 27 amplifies the output of mixer 16 over a band of frequencies that is centered at 30 megacycles. The band width of amplifier 27 is sufficiently wide for amplifying energy of $(30+\Delta$ max$)$ megacycles, where $\Delta$ max is the largest Doppler frequency that the system is able to determine accurately. The bandwidth of this amplifier and the bandwidths of the other intermediate frequency amplifiers in the heterodyning system are equal to that of the discriminator 41 that is connected to the output of the last heterodyning stage of the receiver. The output of amplifier 27 is supplied to one of the inputs of a mixer 28 in a second heterodyning stage for the system.

The second heterodyning stage includes another mixer 29 for heterodyning the output of the oscillator 25 with the output of a local oscillator 30 whose frequency is at 1 megacycle per second, for example. A tuned band pass filter 31 passes the lower side band component only of the output from mixer 29 at a frequency of $(30-1)$ magacycles and blocks the other components. The mixer 28 heterodynes the output of the filter 31 with the output of the I.F. amplifier 27 for producing an output that includes a difference frequency component of $(1+\Delta)$ magacycles. This component is amplified by a tuned intermediate frequency amplifier 32 whose center frequency is at one megacycle, and is supplied to one of the inputs of a mixer 33 at the input of a third heterodyning stage for the system.

The third heterodyning stage includes a mixer 34 for heterodyning the output of the oscillator 30 with the output of another local oscillator 35 whose frequency is at 50 kilocycles per second, for example. A tuned band pass filter 36 passes the lower sideband component only of the output from mixer 34 at a frequency of $(1-.05)$ magacycles and blocks the other components. The mixer 33 heterodynes the output of filter 36 with the ouput of the I.F. amplifier 32 for producing an output that includes a difference frequency component of $(.05+\Delta)$ megacycles, i.e. $(50+\Delta)$ kilocycles. This component is amplified by an intermediate frequency amplifier 38 whose center frequency is at 50 kilocycles, and supplied to the frequency discriminator 41.

At the moment switch 18 is connected to lead 19, the frequency of the output from the heterodyning system equals that of the oscillator 35. This is the case since the difference frequency output from mixer 16 then equals 30 megacycles, the difference frequency output from mixer 28 equals 1 megacycle, and the difference frequency output from mixer 33 equals 50 kilocycles.

The output of the discriminator 41 is supplied to an input transformer 42 of a full wave switch demodulator 43. The demodulator includes a switch element 45 for connecting one side of a capacitor 46 alternately to the opposite ends of the secondary winding of transformer 42. The other side of capacitor 46 is connected to a center tap upon the secondary of this winding.

The switch 45 is actuated by the field provided by an electromagnet 47 that is excited by an alternating switching reference signal upon a lead 51 from a reference generator 50. The generator 50 is connected to the shaft of motor 21 for synchronizing the operation of the switches 18 and 45.

In operation of the system, at the moment the input 15 of mixer 16 is connected to the receiving antenna 14, the frequency of the output of the heterodyning system is equal to the algebraic sum of the Doppler frequency $\Delta$ and the frequency of local oscillator 35. The output from the discriminator 41 is a voltage whose magnitude is related to the difference between said algebraic sum and the center frequency of the discriminator.

At the moment the input of mixer 16 is connected to the section of the transmission line 19, the frequency of the output of the heterodyning system is equal to the frequency of the local oscillator 35 only. The output from the discriminator 41 is a voltage whose magnitude is related to the departure of the frequency of local oscillator 35 from the center frequency of the discriminator. If there is no departure, the output is the null voltage of the discriminator.

Since the switch 18 connects the input 15 of mixer 16 alternately to antenna 14 and to the transmission line 19 at the frequency of motor 21, it should be apparent that the output from the discriminator 41 contains an alternating component of voltage at a frequency of 50 cycles per second. The amplitude of this alternating component is related directly to the Doppler frequency $\Delta$, and is independent of the frequency of the local oscillator 35. This is the case because the signals alternately applied to the discriminator 41 differ in frequency from each other only by the Doppler frequency.

The D.-C. reference level of the output from discriminator 41 changes with any departure in the frequency of local oscillator 35 from the center frequency of discriminator 41, but not the amplitude of the alternating component of this output. The phase of this alternating component is reversed for a change in the sign of the Doppler frequency, as is indicated by the waveforms shown in FIG. 1 at the output of discriminator 41.

The D.-C. reference component of the output from the discriminator 41 is blocked by the transformer 42. The switch demodulator 43 responds to the alternating component of this output to produce a D.-C. voltage across capacitor 46 whose magnitude is related directly to the magnitude of the Doppler frequency $\Delta$. The polarity of this voltage is related to the sign of the Doppler frequency since the switching reference signal supplied to the demodulator from generator 50 is synchronized with the alternating component of the output from the discriminator 41. The alternating component from the discriminator is either in phase with or 180 degrees out of phase with the switching reference signal, depending upon whether the Doppler frequency has a positive or negative sign.

In the arrangement shown in FIG. 1, the switch 18 is provided at the input end of the heterodyning system for producing an output from the heterodyning system whose frequency alternates from one frequency that is equal to the algebraic sum of the frequency of local oscillator 35 and a Doppler frequency to another frequency that is at the frequency of local oscillator 35 only. This output can be produced also by providing a switch at an intermediate point in the heterodyning system instead of at the input of the system as shown in FIG. 1. This alternative arrangement is illustrated in FIG. 2.

Figure 2:
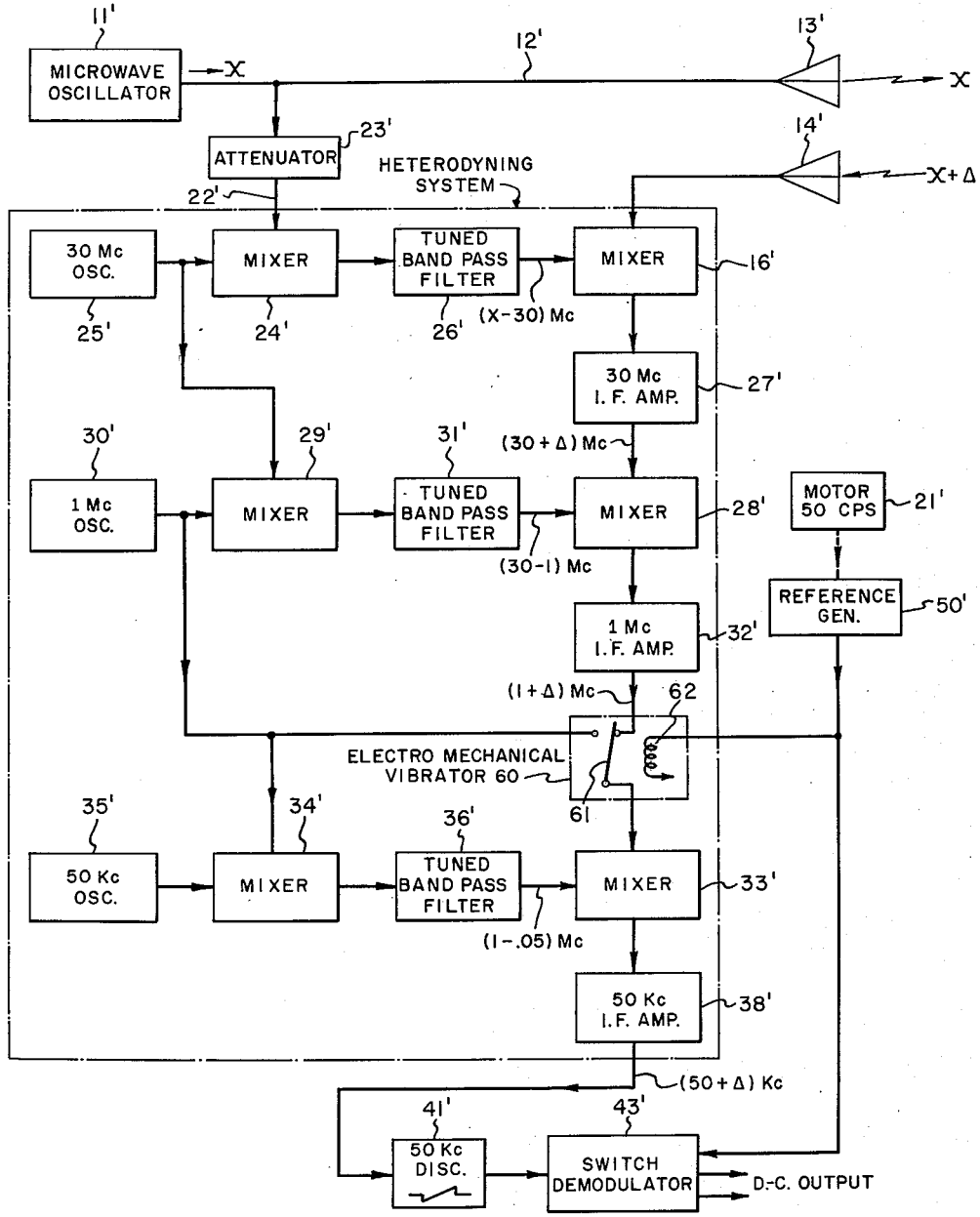
FIG. 2 is a block diagram of a second embodiment of the invention.

Referring to FIG. 2, components that are similar to those in FIG. 1 have been given primed reference numerals. The arrangement of FIG. 2 is generally the same as that of FIG. 1 except that the switch 18, transmission line 19 and attenuator 20 of FIG. 1 are not required to be used. Instead the receiving antenna 14′ is connected constantly to the input 15′ of mixer 16′, and a switch 60 is connected between the output of the I.F. amplifier 32′ and the input of mixer 33′ in the second and third heterodyning stages for the system, respectively.

The switch 60 is an electromechanical vibrator whose switch element 61 has one end connected to the input of mixer 33′. The other end of the element 61 is vibrated between two contacts by an electromagnet 62 that is excited by the switching reference signal from the reference generator 50′. One contact is connected to the output of oscillator 30′, the other contact being connected to the output of the I.F. amplifier 32′.

At the moment switch element 61 is connected to the output of the I.F. amplifier 32′, it completes a connection from the receiving antenna 14′ to the discriminator 41′ through the heterodyning system. The arrangement then operates like that of FIG. 1 for supplying a first input to the discriminator 41′ that a frequency equal to the algebraic sum of the frequency of oscillator 35′ and the Doppler frequency $\Delta$.

At the moment the aforementioned connection is interrupted and the switch element 61 is connected to the output of oscillator 30′, a second input is supplied to the discriminator 41 whose frequency equals that of local oscillator 35′. This second input is produced since the mixer 33′ heterodynes the output of local oscillator 30′ with the output of filter 36′ for producing a difference frequency component that equals the frequency of the local oscillator 35′.

As the switch element 61 is vibrated, the output from discriminator 41′ contains an alternating component whose amplitude is related to the received Doppler frequency $\Delta$. The demodulator 43′ responds to this output for producing a D.-C. signal whose magnitude is related directly to the Doppler frequency $\Delta$ only, and whose polarity is a function of the sign of the Doppler frequency.

Figure 3:
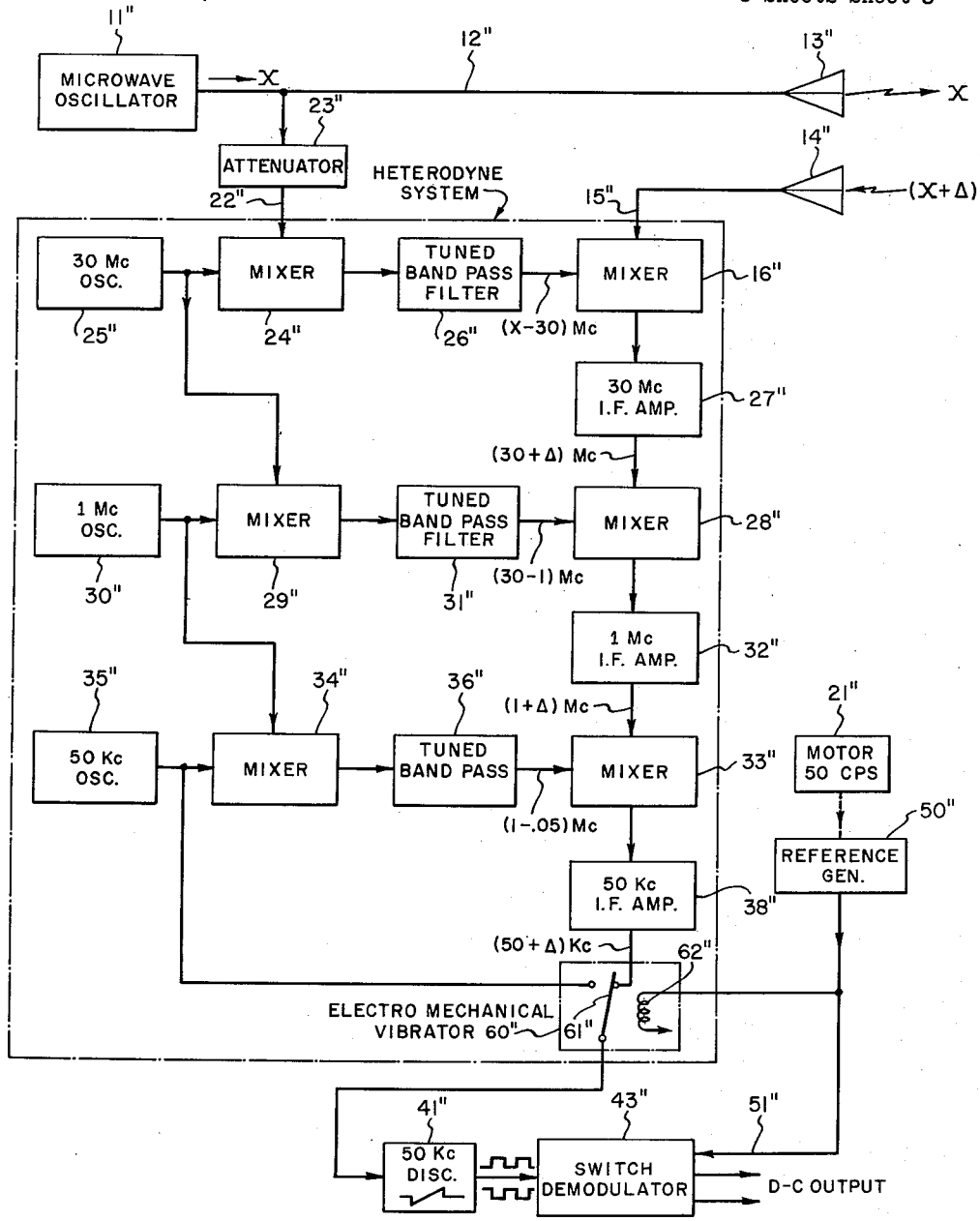
FIG. 3 is a block diagram of still another embodiment of the invention.

Still another arrangement where the switch is provided at the output end of the heterodyning system, rather than at the points shown in FIGS. 1 and 2, is illustrated in FIG. 3. Components that are similar to those shown in FIG. 2 have been given double-primed reference numerals. The switch 60" connects the input of dicriminator 41" directly to the I.F. amplifier 38", or directly to the output of oscillator 35".

At the moment switch element 61" is connected to the output of the I.F. amplifier 38", it completes a connection from the receiving antenna 14" to the discriminator 41" through the heterodyning system. The arrangement then operates like those of FIGS. 1 and 2 for supplying a first input to the discriminator 41" that has a frequency equal to the algebraic sum of the frequency of oscillator 35" and the Doppler frequency Δ.

At the moment the aforementioned connection is interrupted and the switch element 61" is connected to the output of oscillator 35", the input to the discriminator 41" has a frequency which equals that of the local oscillator 35". As the switch element 61" is vibrated, the output from the discriminator 41" has an alternating component just as is produced by the arrangements of FIGS. 1 and 2. The switch demodulator 43" produces a D.-C. output that is related directly to the Doppler frequency Δ, the polarity of this output being a function of the sign of the Doppler frequency.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. The combination of a frequency discriminator, means including an oscillator for supplying an input terminal of said discriminator with a first input whose frequency is equal to the algebraic sum of the frequency of said oscillator and an unknown frequency, means for supplying said terminal with a second input whose frequency equals the frequency of said oscillator, and means for energizing said input terminal alternately with said first and second inputs for producing a discriminator output that has an alternating component whose amplitude is related to said unknown frequency.

2. The combination of claim 1 that further includes means for responding to the output of said discriminator for producing a unidirectional voltage that is related to the amplitude of said alternating component.

3. The combination of claim 2 wherein said last named means comprises a switch demodulator, and means for supplying a switching reference signal to said demodulator that is synchronized with the alternating component of the output from said discriminator.

4. The combination of means for transmitting energy to a target, means for receiving energy that has a frequency which differs from that of the transmitted energy by an unknown frequency that is related to information concerning said target, a heterodyning system that includes at least one oscillator for producing an output at a first frequency that is equal to the algebraic sum of the frequency of said oscillator and said unknown frequency, means for producing an output from said heterodyning ssytem at a second frequency that equals the frequency of said oscillator, means for alternating the output of said heterodyning means from one to the other of said first and second frequencies, and a frequency discriminator for responding to the output of said heterodyning system for producing a voltage that contains an alternating component whose amplitude is related to said unknown frequency.

5. The combination of claim 4 that further includes means for detecting the amplitude of the alternating component of the voltage produced by said discriminator.

6. The combination of claim 5 wherein said detecting means comprises a switch demodulator, and means for supplying a switching reference signal to said demodulator that is synchronized with the alternating component of the voltage produced by said discriminator.

7. The combination of means for transmitting energy to a target, means for receiving energy that has a frequency which differs from that of the transmitted energy by an unknown frequency, a frequency discriminator, a heterodyning system for connecting said transmitting means and receiving means to said discriminator for supplying said discriminator with a first input at a frequency that is equal to the algebraic sum of said unknown frequency and the frequency of a local oscillator in said heterodyning system, means for alternately opening and closing the connection from said receiving means to said discriminator through said heterodyning system for recurrently interrupting said first input, and means for supplying said discriminator with a second input whose frequency equals that of said oscillator at the moments said first input is interrupted.

8. The combination of claim 7 wherein the output of said discriminator has an alternating component whose amplitude is a function of said unknown frequency, and means for producing a unidirectional voltage whose magnitude is a function of the amplitude of said alternating component.

9. The combination of claim 8 wherein said last named means comprises a switch demodulator, and means for supplying a switching reference signal to said demodulator that is synchronized with the opening and closing of the connection from said receiving means to said discriminator.

10. A Doppler radar receiver comprising a heterodyning system for responding to a received high frequency input signal that includes a Doppler frequency for producing an output whose frequency is equal to the algebraic sum of the frequency of a local oscillator and said Doppler frequency, said heterodyning system including means for producing an output whose frequency equals that of said local oscillator, switching means for alternating the outputs produced by said heterodyning system, and a frequency discriminator for responding to said outputs for producing a voltage that has an alternating component whose amplitude is related to said Doppler frequency.

No references cited.